US008292607B2

(12) United States Patent
Oyama et al.

(10) Patent No.: US 8,292,607 B2
(45) Date of Patent: Oct. 23, 2012

(54) POWDER COMPRESSION MOLDING MACHINE

(75) Inventors: Jun Oyama, Kyoto (JP); Katsuhito Fujisaki, Kyoto (JP)

(73) Assignee: Kikusui Seisakusho Ltd., Kyoto-Shi, Kyoto (JP)

( * ) Notice: Subject to any disclaimer, the term of this patent is extended or adjusted under 35 U.S.C. 154(b) by 9 days.

(21) Appl. No.: 12/662,356

(22) Filed: Apr. 13, 2010

(65) Prior Publication Data

US 2010/0266720 A1 Oct. 21, 2010

(30) Foreign Application Priority Data

Apr. 17, 2009 (JP) ................................ P2009-101292

(51) Int. Cl.
*B29C 43/58* (2006.01)

(52) U.S. Cl. .......... 425/78; 425/146; 425/149; 425/153; 425/345; 700/197; 700/204

(58) Field of Classification Search .................. 425/146, 425/149, 153, 78, 345; 700/98, 118, 163, 700/197, 203, 204, 206
See application file for complete search history.

(56) References Cited

U.S. PATENT DOCUMENTS

| | | | | |
|---|---|---|---|---|
| 7,381,356 | B2 * | 6/2008 | Shimada et al. .............. | 425/345 |
| 7,797,076 | B2 * | 9/2010 | Isozumi et al. ................ | 425/147 |
| 2006/0157878 | A1 * | 7/2006 | Brisset et al. ................. | 425/345 |

FOREIGN PATENT DOCUMENTS

| | | |
|---|---|---|
| JP | 63-299893 | 12/1988 |

* cited by examiner

*Primary Examiner* — Richard Crispino
*Assistant Examiner* — Thukhanh Nguyen
(74) *Attorney, Agent, or Firm* — McGinn IP Law Group, PLLC

(57) ABSTRACT

The powder compression molding machine includes: a case having a frame; a fresh air intake provided to the case; a suction port for drawing in an atmosphere in the case; an internal pressure measure that measures internal pressure in the case; a suction force measure that measures a suction force for drawing in the atmosphere in the case from the suction port; and a suction force control device that controls the suction force for drawing in the atmosphere in the case from the suction port. The internal pressure in the case is controlled by controlling the suction force by the suction force controller based on the internal pressure in the case measured by the internal pressure measure and/or the suction force measured by the suction force measure.

17 Claims, 9 Drawing Sheets

POWDER COMPRESSION MOLDING MACHINE

BACKGROUND OF THE INVENTION

1. Field of the Invention

The present invention relates to a powder compression molding machine that compresses a powder material to produce products such as a medical tablet and food.

2. Description of the Related Art

Conventionally, there is a known compression molding machine for producing a tablet by filling a powder material of a medical product, for example, in a die and pressurizing and molding the filled powder material with a punch. In such a powder compression molding machine, a suction port of a dust collector is disposed to collect surplus powder material in a vicinity of a position of generation of the surplus powder material so that the surplus powder material does not contaminate an inside of a case of the machine (refer to Japanese Patent Application Laid-Open No. 63-299893, for example).

In the dust collector of the rotary powder compression molding machine described in Japanese Patent Application Laid-Open No. 63-299893, a dust chamber is provided to surround an upper side and a lower side of a turret supporting the die and the suction port is disposed in the dust chamber to collect the surplus powder material.

The above-described rotary powder compression molding machine does not have a fresh air intake and cannot efficiently collect the dust.

In general, the rotary powder compression molding machine has a substantially sealed structure during operation except a molded article ejecting port, a dust collecting portion, and a powder material charging port so that the powder material does not scatter out of the case. Therefore, if a suction force of dust collection is excessively strong, a negative pressure may be formed in the case to draw fresh air from the molded article ejecting port to thereby scatter dust and the like attached, the molded article and contaminate the inside of the case with the powder material.

SUMMARY OF THE INVENTION

It is an object of the present invention to solve such problems.

A powder compression molding machine according to the invention includes: a case having a frame; an fresh air intake provided to the case; a suction port for drawing in an atmosphere in the case; an internal pressure measure that measures internal pressure in the case; a suction force measure that measures a suction force for drawing in the atmosphere in the case from the suction port; and a suction force controller that controls the suction force for drawing in the atmosphere in the case from the suction port. The internal pressure in the case is controlled by controlling the suction force by the suction force controller based on the internal pressure in the case measured by the internal pressure measure and/or the suction force measured by the suction force measure.

Next, the machine may include at least one nozzle or a plurality of nozzles having the suction port (s) that draws in the atmosphere in the case and may include the suction force controller that controls the suction force of each nozzle and/or the suction force measure that measures the suction force of each nozzle.

If at least two or more nozzles are provided, the suction force controller may set an order of priority of the plurality of nozzles and, set different suction forces according to the order of priority.

The nozzle preferably includes a suction force adjusting opening for adjusting the suction force. In particular, a portion of the nozzle where the suction force adjusting opening is located has a dual structure. Preferably, a dumper frame on an inner side of the dual structure rotates to thereby adjust an opening degree of the suction force adjusting opening. The way of adjustment of the opening degree of the suction force adjusting opening is not limited to the rotation of the dumper frame. The adjustment may be carried out by providing a sliding lid to the suction force adjusting opening and sliding the lid.

In place of the configuration having the suction force adjusting opening in the nozzle, a suction force adjusting nozzle for adjusting the suction force may be provided. In such a configuration, preferably, a suction force adjusting valve is provided to the suction force adjusting nozzle and the suction force of the nozzle is adjusted by adjusting the suction force adjusting valve.

The means of adjusting the suction force of each nozzle is not limited to the above means but may be any means. With this means, it is possible to change the suction force of each nozzle without changing the suction force of the dust collector.

Next, the suction force controller is preferably actuated so that the internal pressure in the case falls within a first predetermined range, when the internal pressure in the case measured by the internal pressure measure is in an outside of the first predetermined range.

The first predetermined range is defined by a first upper limit and a first lower limit smaller than the first upper limit, and is a range greater than the first lower limit and smaller than the first upper limit.

Next, the outside of the first predetermined range is defined as a range of the measured internal pressure in the case greater than or equal to the first upper limit and smaller than a second upper limit, and a range of the measured internal pressure smaller than or equal to the first lower limit and greater than a second lower limit. The second upper limit is limited to a value greater than the first upper limit and the second lower limit is set to a value smaller than the first lower limit (FIG. 5*a*).

Here, the first predetermined range is an optimum acceptable range of the internal pressure in the case.

In other words, when the internal pressure in the case is in the outside of the first predetermined range, the suction force controller is actuated so that the internal pressure falls within the first predetermined range (the optimum acceptable range of the internal pressure in the case).

The predetermined range is different between types of the powder compression molding machines and types of molded articles to be produced and can be set arbitrarily.

Preferably, when the internal pressure in the case and measured by the internal pressure measure is in an outside of the second predetermined range, a control signal is output. The second predetermined range is defined by the second upper limit and the second lower limit and is the range in which the measured internal pressure in the case is greater than or equal to the second upper limit (FIG. 5*a*).

Here, the second predetermined range is a range obtained by putting the first predetermined range and the outside of the first predetermined range together. The outside of the second predetermined range is a range in which the control signal is output. The control signal is output when the fresh air cannot be taken in due to clogging of the fresh air intake and the internal pressure in the case reduces and goes outside the second predetermined range, for example.

Examples of the control signal are an error signal for giving notice that the internal pressure in the case is abnormal pressure and a signal for stopping operation of the powder compression molding machine.

The control signal may be a signal to be output to another machine or device.

Next, when the suction force measured by the suction force measure is in an outside of the third predetermined range, the suction force controller is preferably actuated so that the suction force falls within the third predetermined range.

The third predetermined range is defined by a third upper limit and a third lower limit smaller than the third upper limit, and is a range greater than the third lower limit and smaller than the third upper limit.

Next, the outside of the third predetermined range is defined as a range of the measured suction force greater than or equal to the third upper limit and smaller than a fourth upper limit, and a range of the measured suction force smaller than or equal to the third lower limit and greater than a fourth lower limit. The fourth upper limit is set to a value greater than the third limit and the fourth lower limit is set to a value smaller than the third lower limit (FIG. 5*b*).

Here, the third predetermined range is an optimum acceptable range of the suction force.

In other words, the suction force controller is actuated so that the suction force falls within the third predetermined range (optimum acceptable range) when the suction force is in the outside of the third predetermined range.

The acceptable range of the suction force is different between types of the powder compression molding machines and types of molded articles to be produced and can be set arbitrarily. It is preferable to determine the acceptable range of the suction force in conjunction with the internal pressure in the case.

Preferably, when the suction force measured by the suction force measure is in an outside of a fourth predetermined range, a control signal is output.

The fourth predetermined range is defined by the fourth upper limit and the fourth lower limit and is a range greater than the fourth lower limit and smaller than the fourth upper limit.

Next, the outside of the fourth predetermined range is defined as a range greater than or equal to the fourth upper limit and a range smaller than or equal to the fourth lower limit (FIG. 5*b*).

Here, the fourth predetermined range is obtained by putting the third predetermined range and the outside of the third predetermined range together. The outside of the fourth predetermined range is a range in which the control signal is output. The control signal is output when the internal pressure in the case does not change after the suction force increases beyond the fourth predetermined range due to clogging of the dust collector, for example.

Preferably, the optimum acceptable range of the internal pressure in the case is determined, the optimum acceptable range of the suction force of the dust collector and the fourth predetermined range corresponding to the optimum acceptable range of the internal pressure are determined, and then the outside of the fourth predetermined range is set.

Examples of the control signal are an error signal for giving notice that the suction force (suction pressure) of the dust collector is abnormal pressure and a signal for stopping operation of the powder compression molding machine.

The control signal may be a signal to be output to another machine or device.

The suction force measure is preferably formed by providing the pressure sensor to the nozzle having the suction port for drawing in the atmosphere in the case.

To enhance dust collection efficiency, it is preferable to dispose the fresh air intake and the suction opening so that an airflow is generated in the case and at least a position where the molded articles are taken out of the dies is preferably located in an area through which the airflow passes.

The method of taking in the fresh air from the fresh air intake may be a method by natural aspiration for naturally taking in the air, a method by forced aspiration for forcibly taking in the air by using a fan or the like, or any other aspiration methods.

The present invention is configured as described above and controls the pressure in the case by controlling the suction force by the suction force controller based on the internal pressure in the case measured by the internal pressure measure and/or the suction force measured by the suction force measure.

In this way, it is possible to prevent drawing of the fresh air into the case from the molded article ejecting port to prevent dust from contaminating the inside of the case.

Moreover, by controlling the internal pressure in the case, a dust collection effect can be increased and energy necessary for the dust collection can be suppressed. Therefore, it is possible to achieve energy-saving and efficient dust collection.

Furthermore, because the case has the fresh air intake, it is possible to take the fresh air into the case to generate the airflow in the case. By putting at least the position where the molded articles are taken out of the dies in the area through which the airflow passes, it is possible to efficiently collect dust by utilizing the airflow generated in the case. Moreover, energy can be saved and the dust collection effect can be increased.

DETAILED DESCRIPTION OF THE PREFERRED EMBODIMENT

An embodiment of the present invention will be described with reference to FIGS. 1 to 7.

A rotary powder compression molding machine (hereafter referred to as "molding machine") 100 is for compressing a powder material to produce a product such as a tablet. The powder material in the invention refers to an aggregate of minute solids and includes an aggregate of particles such as what they call granules and an aggregate of powder smaller than the particles.

Figure 1:
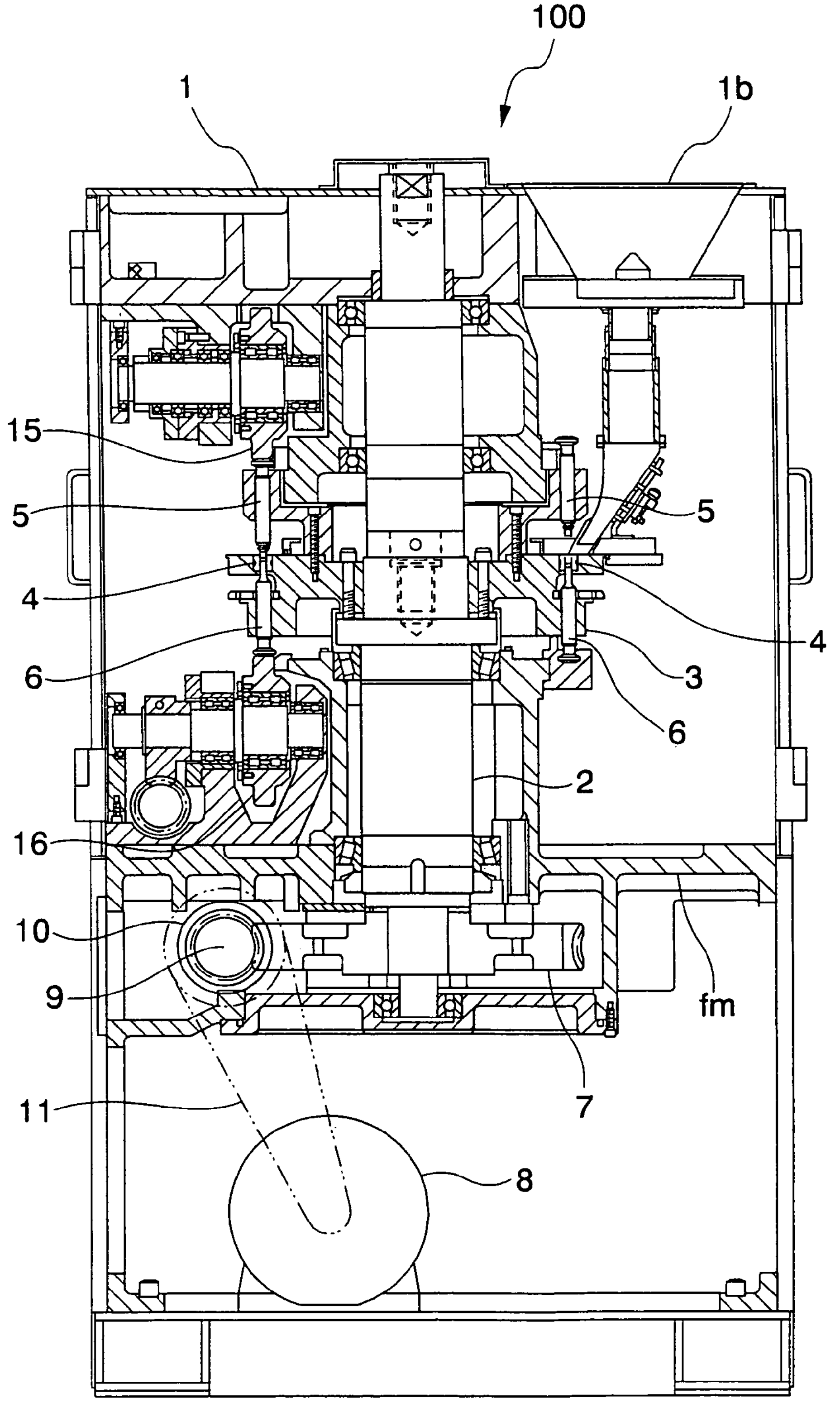
FIG. 1 is a sectional view of a molding machine main body of a powder compression molding machine of an embodiment of the present invention.
Figure 2:
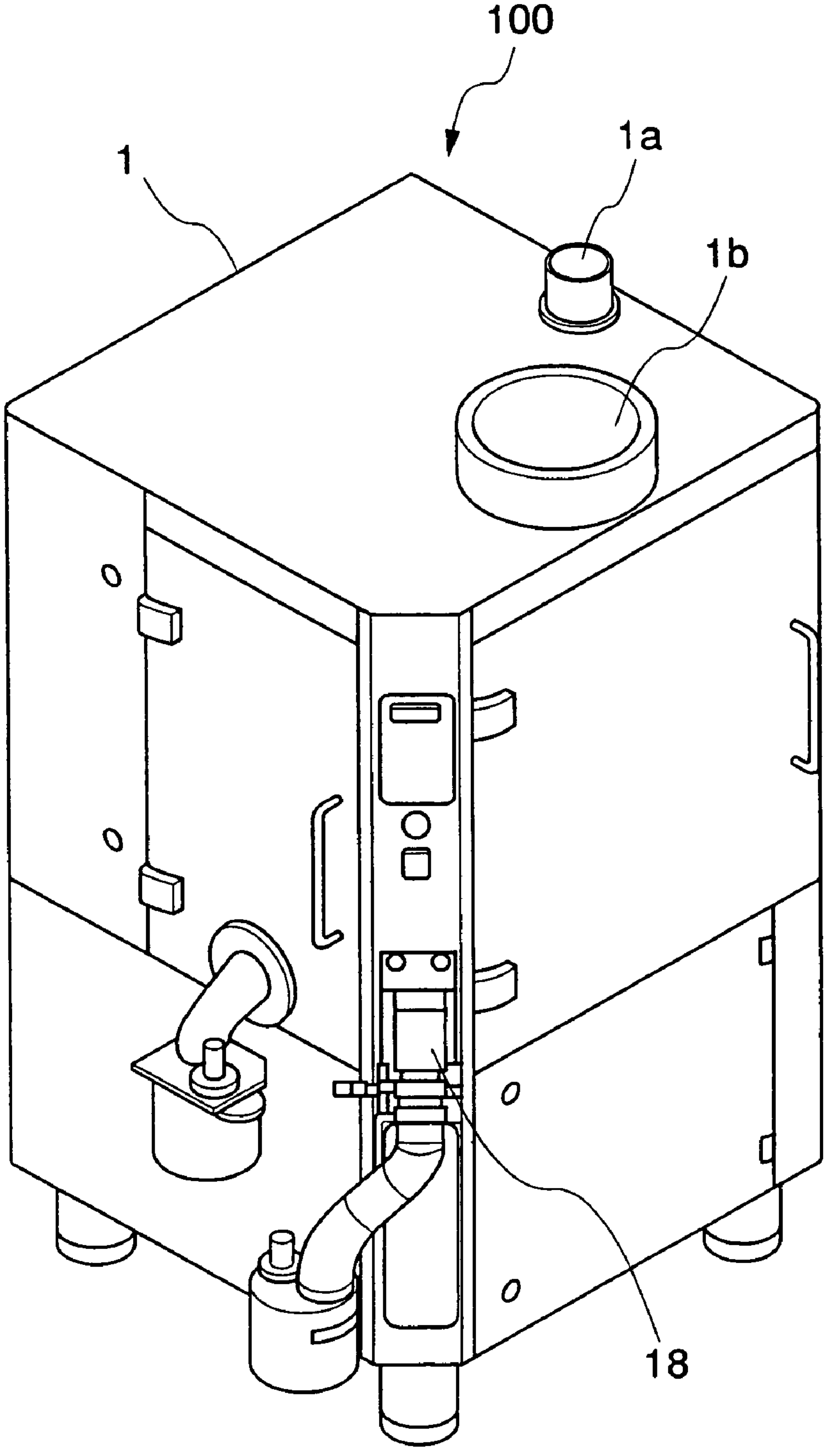
FIG. 2 is a perspective view of an outward appearance of the embodiment.

As shown in FIG. 1, in the molding machine 100, an upright shaft 2 that is a rotary shaft is rotatably disposed in a case 1 having a frame fm, and a turret 3 is mounted on the upright shaft 2. The case 1 is substantially in a shape of a rectangular parallelepiped and has a fresh air intake 1*a* (FIG. 2) for taking fresh air into the case 1 and a feed port 1*b* for the powder material in a ceiling portion thereof. The fresh air intake 1*a* is located in a position substantially above a downstream end portion of a feed shoe 17 that is a powder filling portion (described later).

The turret 3 is in a disk shape and a plurality of cylindrical dies 4 are mounted at predetermined intervals in a circumferential direction on a portion of the turret 3 near an outer periphery. The turret 3 retains upper punches 5 for the respective dies 4 above the portions where the dies 4 are mounted so that the upper punches 5 are movable in a vertical direction and retains lower punches 6 for the respective dies 4 under the portions where the dies 4 are mounted so that the lower punches 6 are movable in the vertical direction. In other words, a pair of upper punch 5 and lower punch 6 is provided for each die 4. A tip of the upper punch 5 comes into and goes out of the die 4 and a tip of the lower punch 6 is inserted into the die 4 all the time.

A worm wheel 7 is mounted on a lower end of the upright shaft 2. With the worm wheel 7, a worm gear 10 mounted on a gear shaft 9 driven by a motor 8 is engaged as shown in FIG. 1. A drive force of the motor 8 is transmitted to the gear shaft 9 by way of a belt 11.

Figure 3:
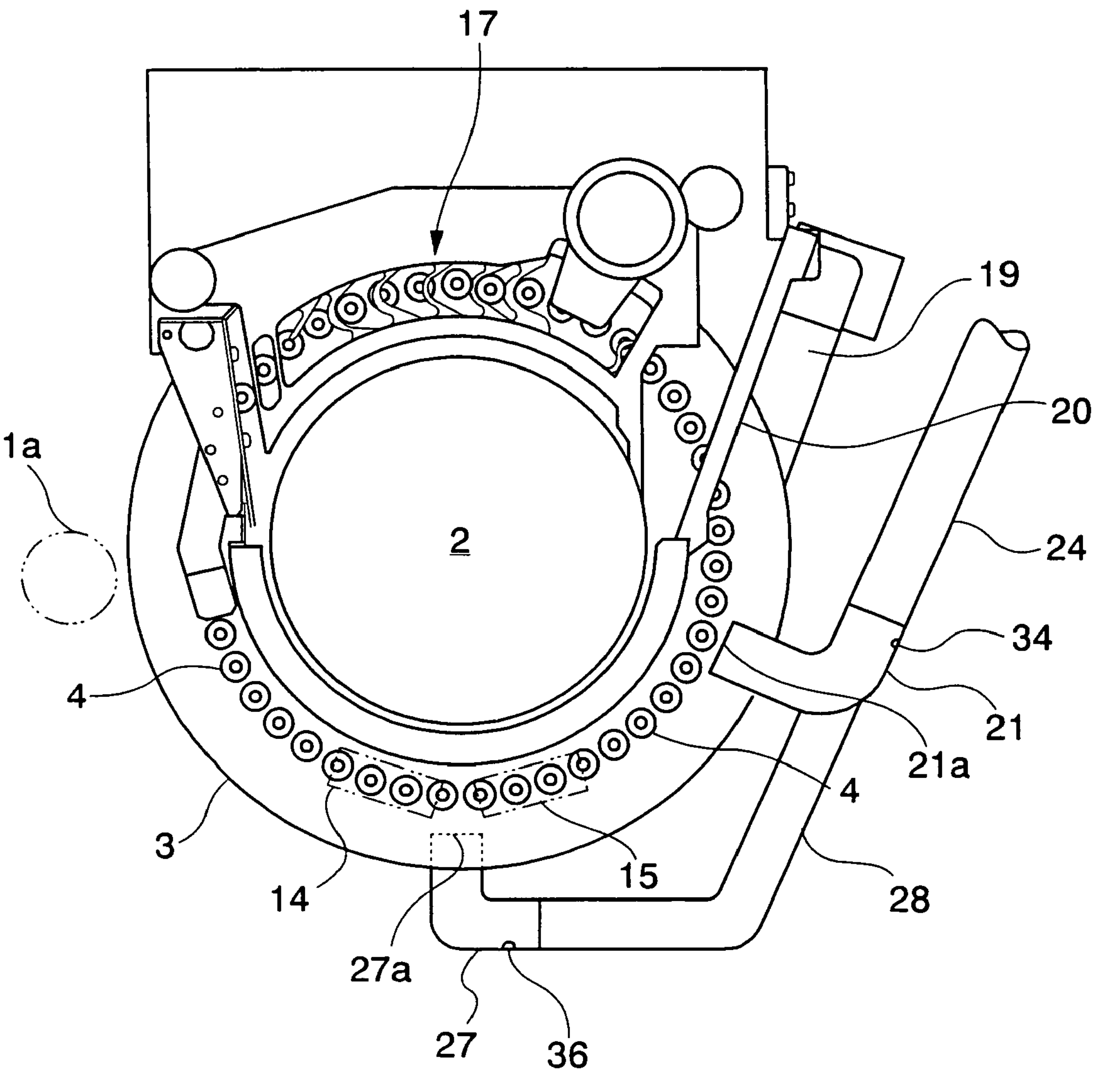
FIG. 3 is a plan view of an essential portion and showing a planar structure around a turret in the embodiment.
Figure 4:
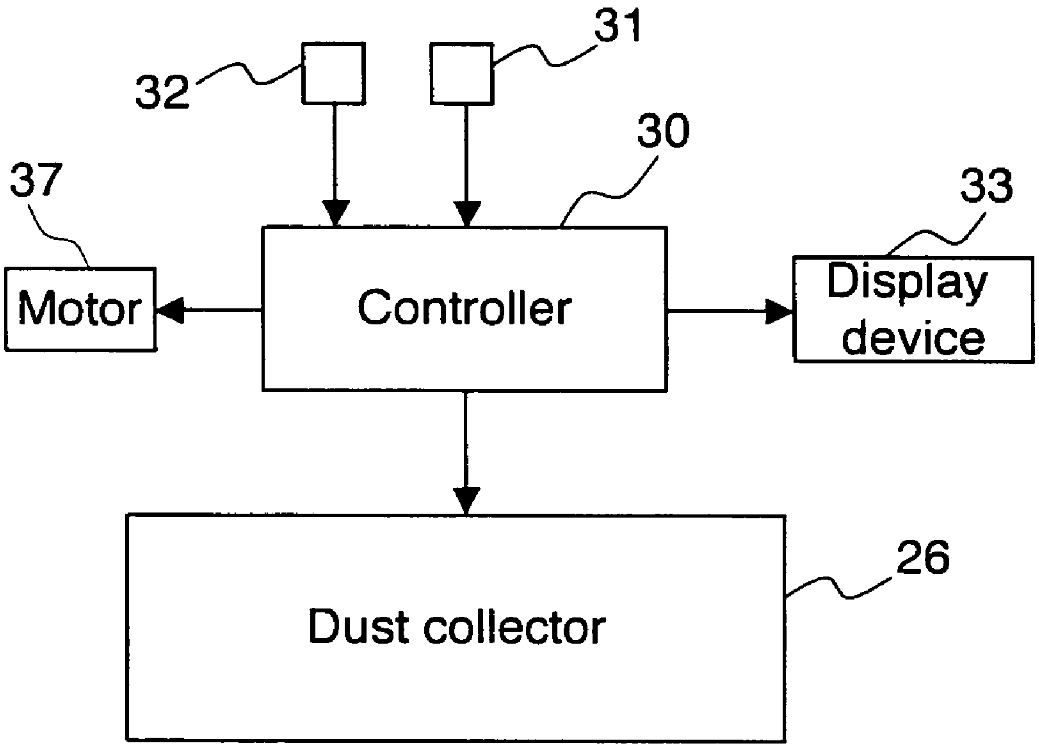
FIG. 4 is a block diagram showing a structure for dust collection in the embodiment.

In predetermined positions in a rotating direction of the turret 3, a pre compression upper roll 14 and a pre compression lower roll (not shown) pairing up with each other and a main compression upper roll 15 and a main compression lower roll 16 pairing up with each other are disposed to sandwich the upper punches 5 and the lower punches 6. As shown in FIG. 3, the pre compression upper roll 14 and the pre compression lower roll and the main compression upper roll 15 and the main compression lower roll 16 bias the upper punches 5 and the lower punches 6 toward each other with the tips of the upper punches 5 and the lower punches 6 inserted into the dies 4 so that the upper punches 5 and the lower punches 6 compress the powder material filled in the dies 4. For this purpose, the pre compression upper roll 14 and the pre compression lower roll and the main compression upper roll 15 and the main compression lower roll 16 are provided in advanced positions in the rotating direction of the turret 3 with respect to the feed shoe 17 for filling the powder material into the dies 4. The main compression upper roll 15 and the main compression lower roll 16 are provided in advanced positions in the rotating direction of the turret 3 with respect to the pre compression upper roll 14 and the pre compression lower roll.

Provided on a downstream side of the main compression upper roll 15 are an ejecting dumper 20 for guiding molded articles discharged from the dies 4 into a molded article ejecting passage 19 communicating with a molded article ejecting port 18 and the feed shoe 17 for feeding the powder material into the dies 4. The feed shoe 17 is provided on a downstream side and in a vicinity of the ejecting dumper 20.

In the embodiment, an upper nozzle 21 having a suction port 21*a* is mounted in a position on a downstream side of the main compression upper roll 15, close to the ejecting dumper 20 and above the turret, and connected to a dust collector 26 via a conduit 24.

Below the turret 3 in a position between the pre compression upper roll 14 and the main compression upper roll 15 and below the turret 3, a nozzle 27 having a suction port 27*a* is mounted and connected to the dust collector 26 via a conduit 28.

Next, a suction force of the dust collector 26 is controlled by a controller 30. In other words, the controller 30 is mainly composed of a computer system and has a suction pressure (hereafter referred to as "suction force") control program for controlling opening degrees of suction force adjusting openings 34 and 36 and/or the suction force of the dust collector 26 based on an output signal from a first pressure sensor 31 mounted in the case 1 to detect internal pressure in the case 1 and/or output signals from second pressure sensors 32 mounted in the dust collector 26 to detect suction force in the dust collector 26.

Here, a second pressure sensor 32 is disposed for each nozzle having the suction port. In other words, the pressure sensors are respectively mounted on the upper nozzle 21 and the lower nozzle 27 so that it is possible to determine which nozzle has a problem when something is wrong with the suction force for the dust collection.

At least one nozzle having the suction port for sucking in an atmosphere in the case 1 or a plurality of such nozzles may be provided and may include a suction force controller for controlling the suction force of each nozzle and/or a suction force measure for measuring the suction force of each nozzle.

In the embodiment, suction force adjusting openings 34 and 36 for adjusting the suction forces are provided to the respective nozzles 21 and 27, and the suction forces from the suction ports 21*a* and 27*a* are adjusted by adjusting the opening degrees of the suction force adjusting openings 34 and 36.

In particular, the suction force adjusting openings 34 and 36 are formed on side walls of the nozzles 21 and 27, and have dumper frames (not shown) rotatably mounted in the nozzles 21 and 27 to form dual structures. By rotating the dumper frames, the opening degrees of the suction force adjusting openings 34 and 36 are adjusted. The dumper frames are driven by a motor 37. In this structure, the controller 30 controls rotation angles of the dumper frames to adjust the suction forces of the respective nozzles 21 and 27 without changing the suction forces of the dust collector 26.

Therefore, the controller 30 controls the suction force of the dust collector 26 and also controls the motor 37 to control the rotation angles of the dumper frames and thereby control the suction forces of the respective nozzles 21 and 27.

Instead of the suction force adjusting openings 34 and 36, suction force adjusting nozzles (not shown) for adjusting the suction forces may be employed.

In particular, the suction force adjusting nozzles are provided to the respective nozzles 21 and 27 and suction force adjusting valves (not shown) are provided to the suction force adjusting nozzles. By controlling the suction force adjusting valves, the suction forces from the suction ports 21*a* and 27*a* are adjusted.

Therefore, the controller 30 controls the suction force of the dust collector 26 and controls the suction force adjusting valves to thereby control the suction forces of the respective nozzles 21 and 27.

At this time, the suction force control program controls the suction force adjusting valves of the suction force adjusting nozzles and/or the suction force of the dust collector 26.

Figure 5:
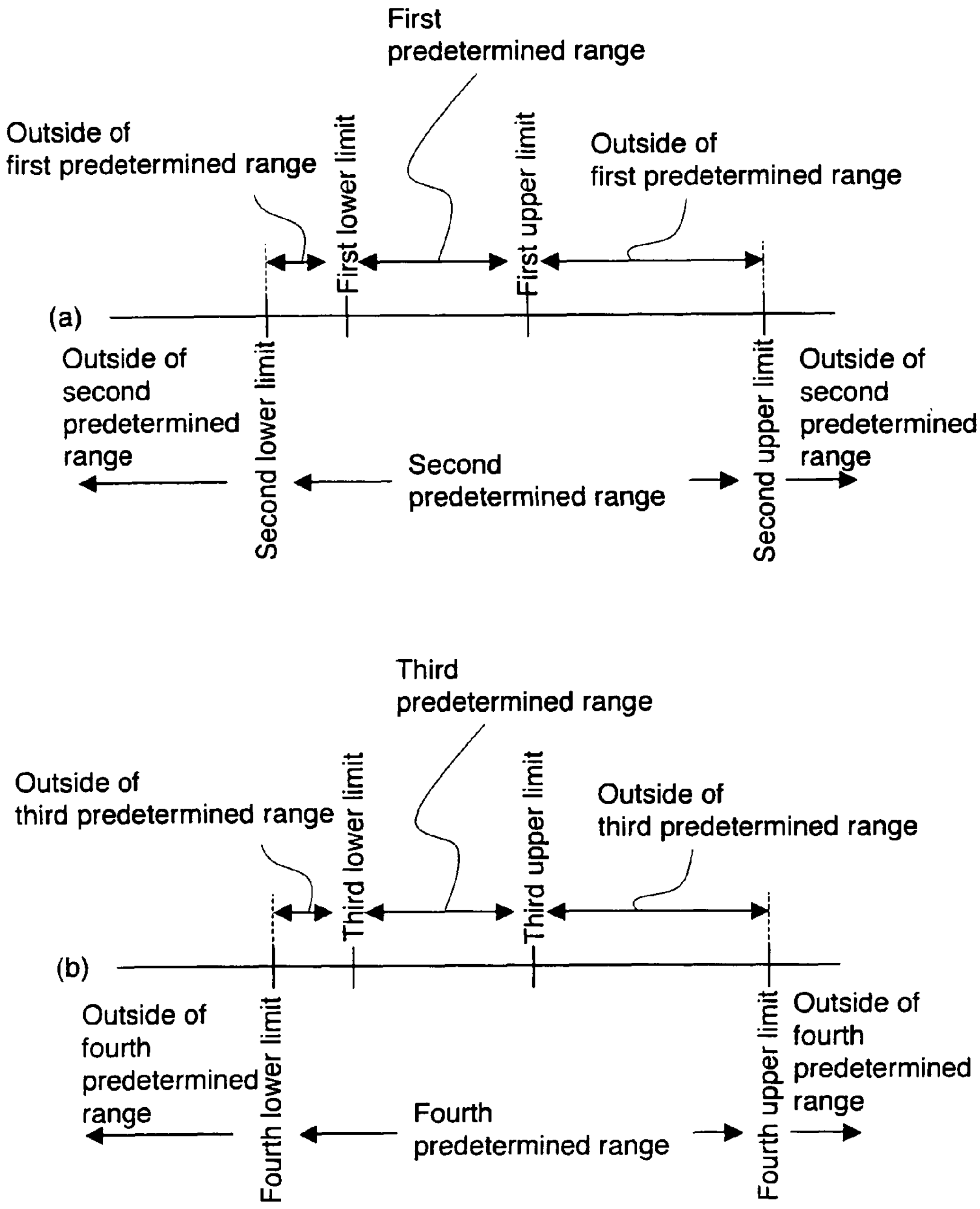
FIGS. 5(*a*) and 5(*b*) are graphs showing predetermined ranges of internal pressure and a suction force set for a dust collecting force control program in the embodiment.
Figure 6:
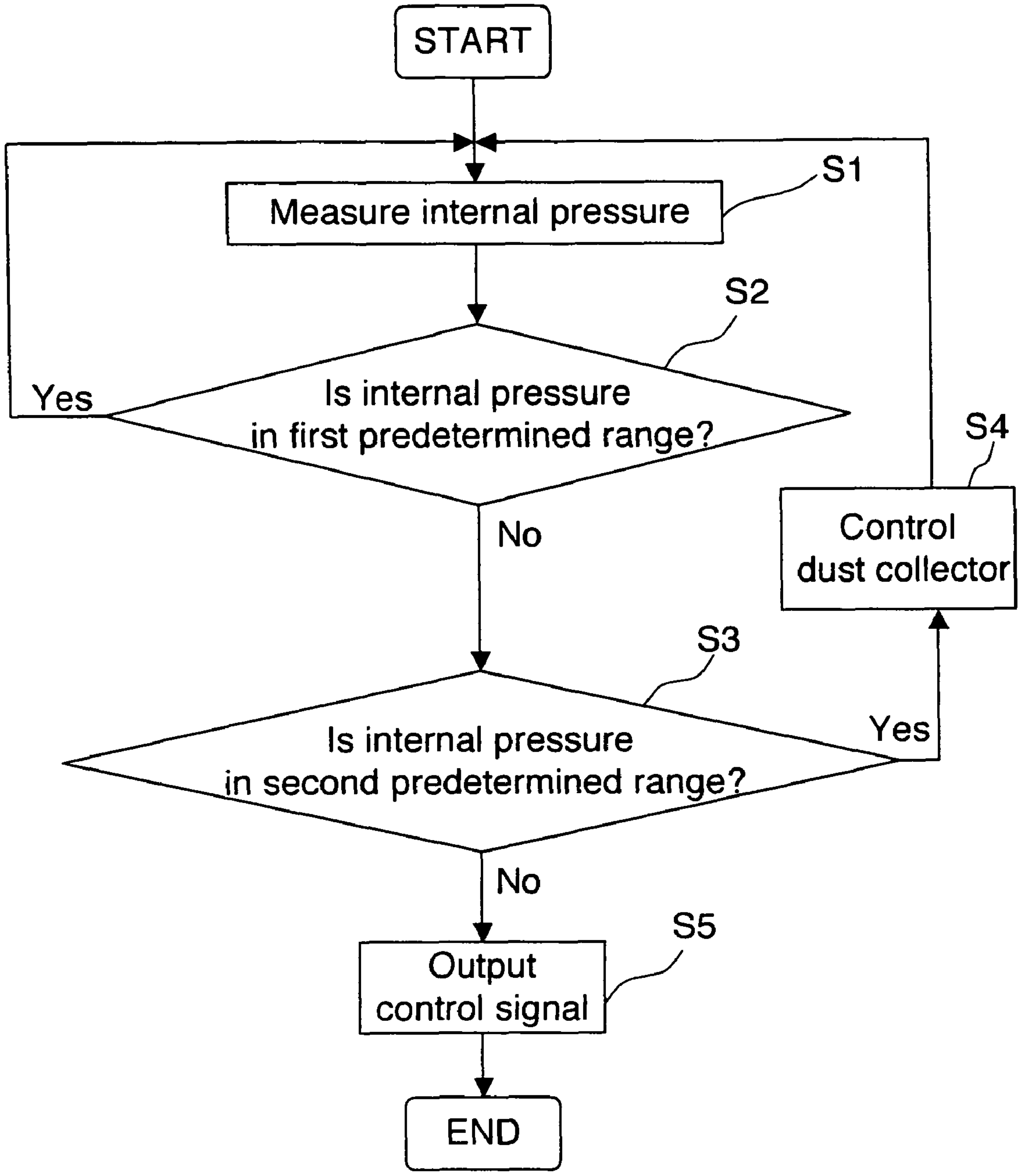
FIG. 6 is a flowchart showing a control procedure of the embodiment.
Figure 7:
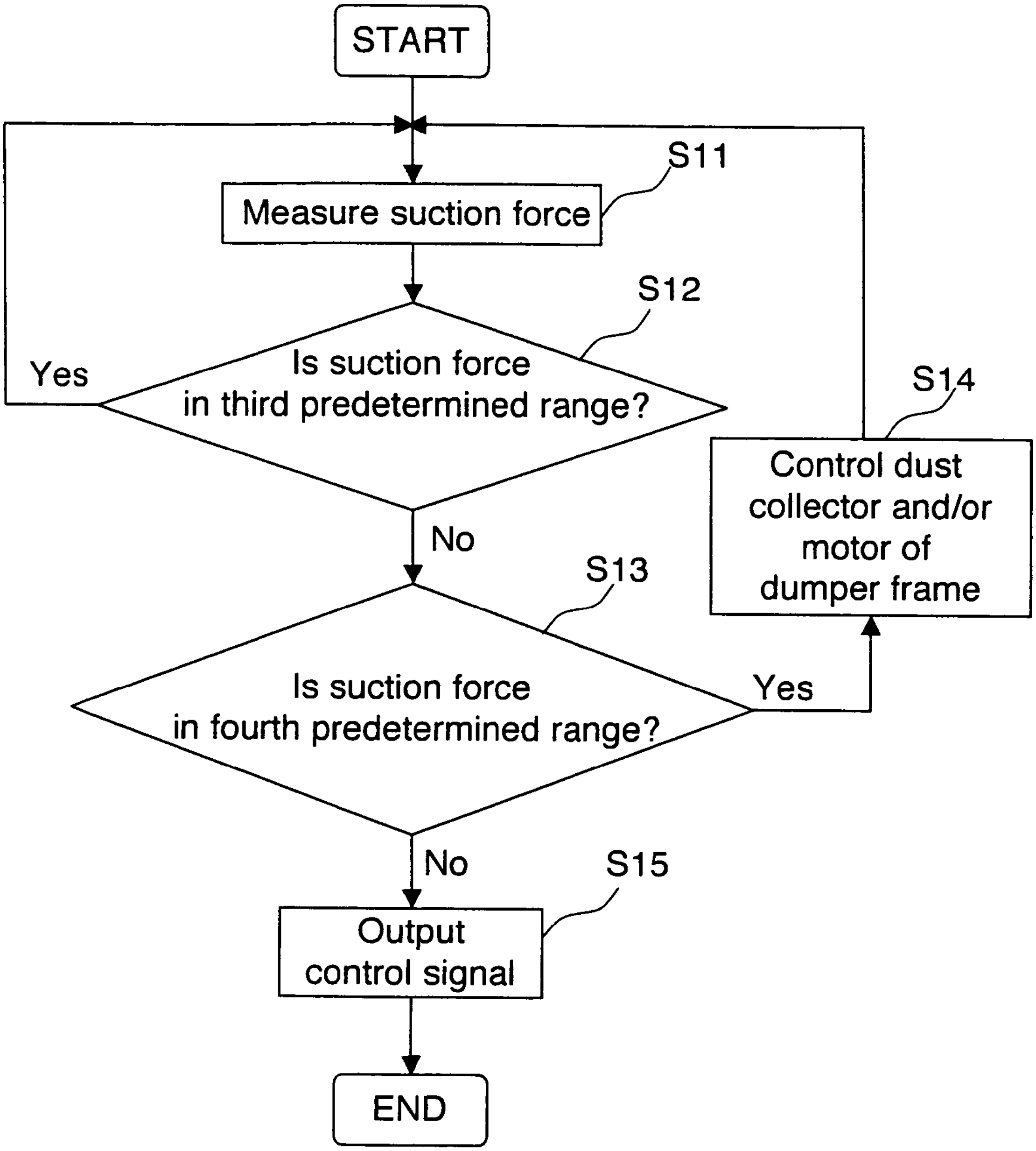
FIG. 7 is a flowchart showing the control procedure of the embodiment.

Next, the suction force control program defines a first predetermined range, an outside of the first predetermined range, a second predetermined range, and an outside of the second predetermined range (shown in FIG. 5(*a*)) set for the internal pressure so as to control the dust collection of the dust collector 26.

In other words, the suction force control program defines, for the internal pressure, the first predetermined range, the outside of the first predetermined range, the second predetermined range, and the outside of the second predetermined range, determined by a first upper limit, a first lower limit smaller than the first upper limit, a second upper limit greater than the first upper limit, and a second lower limit smaller than the first lower limit. Then, the suction force control program issues a command to output a control signal indicating that the internal pressure is abnormal when the measured internal pressure is outside the second predetermined range.

The suction force control program further defines a third predetermined range, an outside of the third predetermined range, a fourth predetermined range, and an outside of the fourth predetermined range (shown in FIG. 5(*b*)) set for the suction force.

In other words, the suction force control program defines, for the suction force, the third predetermined range, the outside of the third predetermined range, the fourth predetermined range, and the outside of the fourth predetermined range, determined by a third upper limit, a third lower limit smaller than the third upper limit, a fourth upper limit greater than the third upper limit, and a fourth lower limit smaller than the third lower limit. Then, the suction force control program issues a command to output a control signal indicating that the suction force is abnormal when the measured suction force is outside the fourth predetermined range.

Operation of the controller 30 will be described below with a control procedure by the suction force control program. The suction force control program is constantly performed during operation of the molding machine. An internal pressure routine (FIG. 6) for controlling the dust collector 26 according to change of the internal pressure in the case 1 and a suction force routine (FIG. 7) for controlling the dust collector 26 and/or the suction force adjusting openings 34 and 36 according to change of the suction force (s) of the dust collector 26 and/or the nozzles 21 and 27 will be described in the following description and these routines are performed along with each other.

The suction routine is applied to each of the nozzle having the suction port.

First, in step S1 of the internal pressure routine, an internal pressure measure measures the internal pressure based on an output signal output from the first pressure sensor 31. Next, in step S2, the controller 30 determines whether or not the internal pressure measured by the internal pressure measure is a value included in the first predetermined range. If the controller 30 determines that the internal pressure measured by the internal pressure measure is the value included in the first predetermined range in step S2, the internal pressure is normal and therefore the routine returns to step S1.

On the other hand, if the controller 30 determines that the measured internal pressure is not included in the first predetermined range in step S2, whether or not the internal pressure measured by the internal pressure measure is a value included in the second predetermined range is determined in step S3.

Here, the second predetermined range is a range obtained by putting the first predetermined range and the outside of the first predetermined range together.

If the controller 30 determines that the internal pressure is not included in the first predetermined range but included in the second predetermined range, i.e., the internal pressure is in an outside of the first predetermined range, the suction force controller controls the dust collector 26 to adjust the suction force so that the internal pressure becomes a value included in the first predetermined range in step S4.

Here, the outside of the first predetermined range is such a range that a value in this range can be corrected to a value in the first predetermined range and the range can be determined by a value set arbitrarily.

If the controller 30 determines that the internal pressure measured by the internal pressure measure is not included in the second predetermined range, i.e., outside the second predetermined range, the controller 30 outputs an operation stop signal indicating that the internal pressure is an abnormal value in step S5.

Next, in step S11 in the suction force routine, the suction force measure measures the suction force based on an output signal output from the second pressure sensor 32. Next, in step S12, the controller 30 determines whether or not the suction force measured by the suction force measure is a value included in the third predetermined range. If the controller 30 determines that the suction force measured by the suction force measure is the value included in the third predetermined range in step S12, the suction force is normal and therefore the routine returns to step S11.

On the other hand, if the controller 30 determines that the suction force measured by the suction force measure is not included in the third predetermined range in step S12, the controller 30 determines whether or not the suction force measured by the suction force measure is a value included in the fourth predetermined range in step S13.

Here, the fourth predetermined range is a range obtained by putting the third predetermined range and the outside of the third predetermined range together.

If the controller 30 determines that the suction force is not included in the third predetermined range but is included in the fourth predetermined range, i.e., if the suction force is outside the third predetermined range, the suction force controller controls the dust collector 26 and/or the suction force adjusting openings 34 and 36 to adjust the suction force(s) of the dust collector 26 and/or the suction force adjusting openings 34 and 36 so that the suction force becomes a value included in the third predetermined range in step S14.

Here, the outside of the third predetermined range is such a range that a value in this range can be corrected to a value in the third predetermined range and the range can be determined by a value set arbitrarily.

If it is determined that the suction force measured by the suction force measure is not included in the fourth predetermined range, i.e., the suction force is outside the fourth predetermined range, the controller 30 outputs an operation stop signal indicating that the suction force is an abnormal value in step S15.

In this structure, if molding of the powder material is started and the dust collector 26 is actuated, the atmosphere near the suction ports 21*a* and 27*a* of the upper nozzle 21 and the lower nozzle 27 is drawn into the dust collector 26 via the respective suction ports 21*a* and 27*a*. At this time, the fresh air flows into the case 1 from the fresh air intake 1*a* formed in a ceiling portion of the case 1. The incoming fresh air forms an airflow toward the suction ports 21*a* and 27*a* because the atmosphere in the case 1 is drawn in from the suction ports 21*a* and 27*a*. Therefore, the atmosphere including the powder material is efficiently drawn in from the respective suction ports 21*a* and 27*a* of the upper nozzle 21 and the lower nozzle 27.

If the dust collector 26 is actuated, the controller 30 controls the internal pressure in the case 1 and the suction force based on the output signals from the first pressure sensor 31 and the second pressure sensor 32. First, if the internal pressure measured by the internal pressure measure based on the output signal from the first pressure sensor 31 is a value included in the first predetermined range and the suction force measured by the suction force measure based on the output signal from the second pressure sensor 32 is a value included in the third predetermined range, the controller 30 performs the processing in step S1, step S2, step S11, and step S12 in the suction force control program. In this case, both the internal pressure in the case 1 and the suction force are in the optimum acceptable range.

Next, if the internal pressure measured by the internal pressure measure based on the output signal from the first pressure sensor 31 is a value included in the outside of the first predetermined range and the suction force measured by the suction force measure based on the output signal from the second pressure sensor 32 is a value included in the third predetermined range, the controller 30 performs the processing in step S1, step S2, step S3, and step S4 in the suction force control program.

In this way, the controller 30 controls the suction force with the suction force controller and controls the internal pressure so that the internal pressure falls within the first predetermined range.

Next, if the internal pressure measured by the internal pressure measure based on the output signal from the first pressure sensor 31 is a value outside the second predetermined range and the suction force measured by the suction force measure based on the output signal from the second pressure sensor 32 is a value included in the third predetermined range, the controller 30 performs the processing in step S1, step S2, step S3, and step S5 in the suction force control program.

As a result, the controller 30 outputs the control signal. The control signal is input to a display device 33 for displaying abnormality to thereby give notice of occurrence of an abnormal condition of the dust collector 26.

Next, if the internal pressure measured by the internal pressure measure based on the output signal from the first pressure sensor 31 is a value included in the first predetermined range and the suction force measured by the suction force measure based on the output signal from the second pressure sensor 32 is a value included in the outside of the third predetermined range, the controller 30 performs the processing in step S11, step S12, step S13, and step S14 in the suction force control program.

Because the internal pressure changes due to the change of the suction force, the controller 30 performs the processing in step S1, step S2, step S3, and step S4 again.

In this way, the controller 30 controls the suction force with the suction force controller so that the suction force falls within the third predetermined range and the internal pressure falls within the first predetermined range.

Next, if the internal pressure measured based on the output signal from the first pressure sensor 31 is a value included in the first predetermined range and the suction force measured by the suction force measure based on the output signal from the second pressure sensor 32 is a value outside the fourth predetermined range, the controller 30 performs the processing in step S11, step S12, step S13, and step S15 in the suction force control program.

As a result, the controller 30 outputs the control signal to the display device 33. The control signal is input to the display device 33 for displaying abnormality to thereby give notice of occurrence of the abnormal condition of the dust collector 26.

In this way, the controller 30 controls the suction force (s) of the dust collector 26 and/or the nozzles 21 and 27 so that it (they) fall (s) within the third predetermined range to thereby control the internal pressure in the case 1 so that it falls within the first predetermined range.

As a result, it is possible to prevent drawing in of the fresh air from the molded article ejecting port 18 into the case 1 and the powder material attached to the molded article does not contaminate the inside of the case 1.

Moreover, because the case 1 has the fresh air intake 1*a*, it is possible to take the fresh air into the case 1 to generate the airflow in the case 1. By putting at least a position where the molded articles are taken out of the dies 4 in an area through which the airflow passes, it is possible to efficiently collect dust by utilizing the airflow generated in the case 1. Moreover, energy can be saved and a dust collection effect can be increased.

The invention is not limited to the above-described embodiment.

The dust collector may be provided to correspond to each nozzle. By providing the dust collector for each nozzle, it is possible to finely control the internal pressure and the suction force according to the state of the atmosphere that the nozzle draws in.

The nozzles may be disposed in a plurality of positions other than the above-described positions where the powder material is likely to scatter in molding machines for dry-coated tablets and layered tablets.

Moreover, the controller 30 may determine that the internal pressure and the suction force are not included in the above-described predetermined ranges when the same results can be obtained in multiple measurements instead of determining the internal pressure and the suction force based on the internal pressure and the suction force obtained in single measurement.

Figure 8:
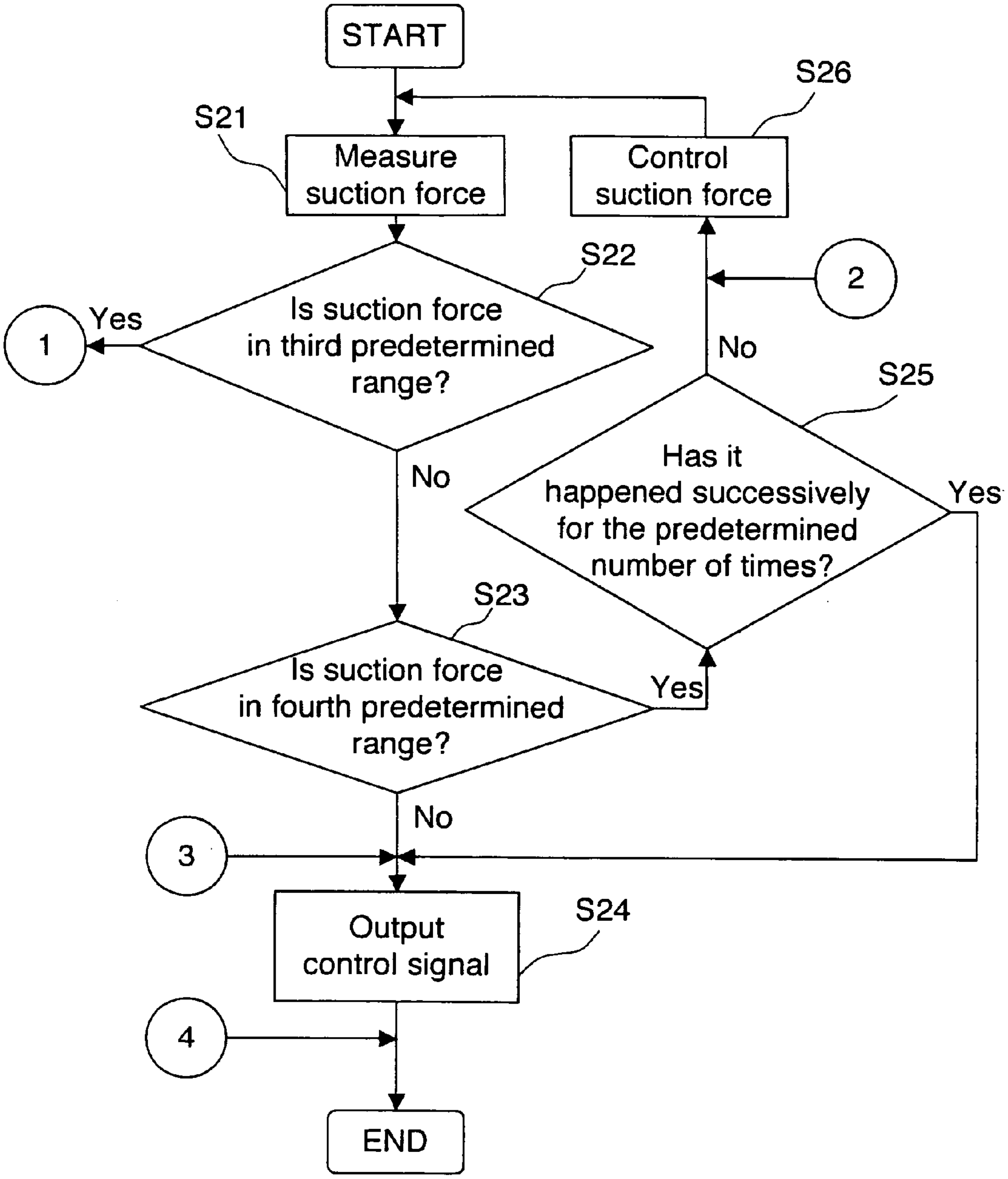
FIG. 8 is a flowchart showing a control procedure of another embodiment of the present invention.
Figure 9:
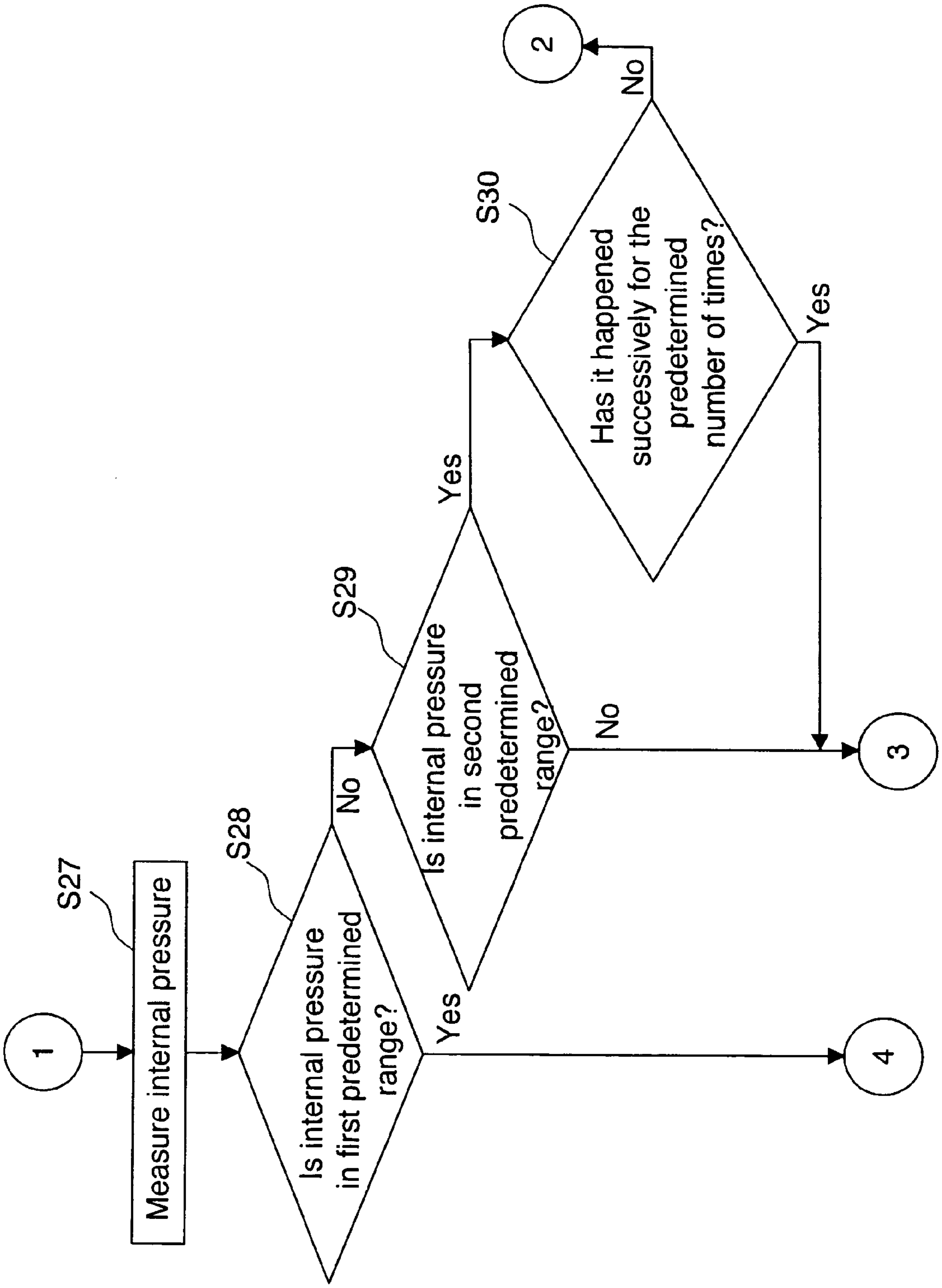
FIG. 9 is a flowchart showing the control procedure of the other embodiment of the present invention.

A specific procedure is shown in FIGS. 8 and 9. First, in step S21, the suction force measure measures the suction force similarly to the above embodiment. In step S22, whether or not the measured suction force is in the third predetermined range is determined. If the measured suction force is in the third predetermined range as a result of the determination, measurement of the internal pressure is carried out (step S27). If the measured suction force is outside the third predetermined range, the procedure goes to step S23. In step S23, whether or not the measured suction force is in the fourth predetermined range is determined. If the measured suction force is not in the fourth predetermined range, i.e., outside the fourth predetermined range as a result of the determination, the procedure goes to step S24 where a control signal is output. If the suction force is in the fourth predetermined range, i.e., outside the third predetermined range, the process goes to step S25.

In step S25, whether or not the suction force not in the third predetermined range and in the fourth predetermined range, i.e., in the outside of the third predetermined range is measured successively for the predetermined number of times is determined. If it is determined that such a suction force is measured for the predetermined successive times, the control signal is output in step S24. If the number of times does not reach the predetermined number, the procedure goes to step S26. In step S26, the suction force controller controls the suction force so that the suction force falls within the third predetermined range.

In step S27, the internal pressure measure measures the internal pressure. Next, in step S28, whether or not the measured internal pressure is in the first predetermined range is determined. If the measured internal pressure is in the first predetermined range as a result of the determination, the control ends. If the internal pressure is not in the first predetermined range, the procedure goes to step S29. In step S29, whether or not the measured internal pressure is in the second predetermined range is determined. If the measured internal pressure is not in the second predetermined range, i.e., outside the second predetermined range, as a result of the determination, the procedure goes to step S24 where the control signal is output. If the internal pressure is in the second predetermined range, i.e., outside the first predetermined range, the procedure goes to step S30.

In step S30, whether or not the internal pressure not in the first predetermined range and in the second predetermined range, i.e., in the outside of the first predetermined range is measured for predetermined successive times is determined. If it is determined that such internal pressure is measured successively for the predetermined number of times, the control signal is output in step S24. If the number of times does not reach the predetermined number, the procedure goes to step S26.

By employing such a configuration, it is possible to respond to a situation in which measured values of the internal pressure and the suction force sporadically become abnormal value to disturbances (electric noise) and the like. In other words, in this configuration, the internal pressure and the suction force are not controlled when the values are measured if the measured values are temporarily abnormal due to the electric noise, for example. Therefore, the internal pressure and the suction force are controlled only when they actually change. As a result, it is possible to restrain the internal pressure and the suction force from becoming unstable.

Specific configurations of other respective portions are not limited to those in the embodiment, either and the invention may be modified in various ways within a range not departing from the purposes thereof.

As an application of the invention, the invention can be applied to various types of powder compression molding machines that compress the powder material to produce molded articles other than the above-described rotary powder compression molding machine.

What is claimed is:

1. A powder compression molding machine comprising:

a case having a frame;

a fresh air intake provided to the case;

at least one nozzle disposed within an interior of the case;

a suction port for drawing in an atmosphere from within the case, said suction port being disposed within the interior of the case at end of said at least one nozzle;

an internal pressure measure that measures internal pressure in the case;

a suction force measure that measures a suction force for drawing in the atmosphere from within the case from the suction port; and a suction force controller that controls the suction force for drawing in the atmosphere in the case from the suction port, said suction force controller comprising a suction force adjusting opening disposed on the at least one nozzle, wherein the internal pressure in the case is controlled by controlling the suction force by the suction force controller based on at least one of the internal pressure in the case measured by the internal pressure measure and the suction force measured by the suction force measure.

2. A powder compression molding machine according to claim 1, wherein, if a first predetermined range is defined by a first upper limit and a first lower limit smaller than the first upper limit and if an outside of the first predetermined range is defined as a range greater than or equal to the first upper limit and smaller than a second upper limit greater than the first limit and a range smaller than or equal to the first lower limit and greater than a second lower limit smaller than the first lower limit, the suction force controller is actuated so that the pressure in the case falls within the first predetermined range when the internal pressure is in the outside of the first predetermined range.

3. A powder compression molding machine according to claim 2, wherein, if a second predetermined range is defined by the second upper limit and the second lower limit and if an outside of the second predetermined range is defined as a range greater than or equal to the second upper limit and a range smaller than or equal to the second lower limit, a control signal is output when the internal pressure is in the outside of the second predetermined range.

4. A powder compression molding machine according to claim 3, wherein, if a third predetermined range is defined by a third upper limit and a third lower limit smaller than the third upper limit and if an outside of the third predetermined range is defined as a range greater than or equal to the third upper limit and smaller than a fourth upper limit greater than the third limit and a range smaller than or equal to the third lower limit and greater than a fourth lower limit smaller than the third lower limit, the suction force controller is actuated so that the suction force falls within the third predetermined range when the suction force is in the outside of the third predetermined range.

5. A powder compression molding machine according to claim 4, wherein, if a fourth predetermined range is defined by the fourth upper limit and the fourth lower limit and if an outside of the fourth predetermined range is defined as a range greater than or equal to the fourth upper limit and a range smaller than or equal to the fourth lower limit, a control signal is output when the suction force is outside the fourth predetermined range.

6. A powder compression molding machine according to claim 1, further comprising a dust collector, said suction port being connected to said dust collector.

7. A powder compression molding machine according to claim 1, further comprising a powder filling portion, wherein said fresh air intake is disposed above a downstream end of said powder filling portion.

8. A powder compression molding machine according to claim 1, wherein said suction force controller controls an opening degree of said suction force adjusting opening.

9. A powder compression molding machine according to claim 1, wherein said suction port is one of a plurality of suction ports.

10. A powder compression molding machine according to claim 9, wherein said at least one nozzle is one of a plurality of nozzles, said plurality of suction ports being disposed on said plurality of nozzles.

11. A powder compression molding machine according to claim 10, wherein said suction force controller is operable to set an order of priority of the plurality of nozzles and to set different suction forces based on the order of priority.

12. A powder compression molding machine according to claim 1, further comprising a pressure sensor mounted on the at least one nozzle.

13. A powder compression molding machine according to claim 6, wherein when the dust collector is actuated, the atmosphere near the suction port is drawn into the dust collector through the suction port, and wherein incoming air from the fresh air intake forms an airflow toward the suction port.

14. A powder compression molding machine according to claim 13, further comprising a plurality of dies, wherein an area in which molded articles are removed from said plurality of dies is positioned within the airflow.

15. A powder compression molding machine according to claim 1, further comprising a pressure sensor mounted on the at least one nozzle, wherein an opening amount of said suction force adjusting opening is controlled based on an output signal from said pressure sensor.

16. A machine, comprising:

a case;

a fresh air intake disposed on the case;

a dust collector;

at least one nozzle connected to the dust collector, said nozzle comprising:

a suction port disposed at an end of said at least one nozzle for drawing in an atmosphere from an area in a vicinity of said suction port into said dust collector; and a suction force adjusting opening disposed along said at least one nozzle; and a suction force controller that controls a suction force of the dust collector.

17. A powder compression molding machine according to claim 1, further comprising a dumper frame rotatably mounted on said at least one nozzle, wherein said dumper frame adjusts an opening degree of said suction force adjusting opening by rotation of said dumper frame.

* * * * *